United States Patent [19]
Lankston

[11] 4,288,001
[45] Sep. 8, 1981

[54] CLOSURE ARRANGEMENT FOR PRESSURE DEVICE

[75] Inventor: Robert J. Lankston, Shawnee, Kans.

[73] Assignee: Gulf & Western Manufacturing Company, New York, N.Y.

[21] Appl. No.: 169,036

[22] Filed: Jul. 15, 1980

[51] Int. Cl.³ .............................................. B65D 45/00
[52] U.S. Cl. ................................... 220/316; 220/319; 220/DIG. 20
[58] Field of Search ....... 220/316, 319, 320, DIG. 20, 220/314, 323, 321; 292/256.6, 256.67, 256.65; 251/256.75, 333

[56] References Cited

U.S. PATENT DOCUMENTS

| | | |
|---|---|---|
| 3,077,360 | 2/1963 | Israel . |
| 3,187,929 | 6/1965 | Shaw, Jr. . |
| 3,310,329 | 3/1967 | Luker .................................... 220/319 |
| 3,429,476 | 2/1969 | Hunter . |
| 3,458,083 | 7/1969 | Erwin, Jr. ........................... 220/316 |
| 3,731,837 | 5/1973 | Platts . |
| 4,102,474 | 7/1978 | Platts .................................. 220/323 |
| 4,139,118 | 2/1979 | Parker ................................ 220/316 |

Primary Examiner—George T. Hall
Attorney, Agent, or Firm—Meyer, Tilberry & Body

[57] ABSTRACT

A pressure device is provided with a cover member which is removably attached thereto by a pair of clamping rings which are hydraulically actuated laterally outwardly and inwardly relative to flanges on the pressure device and cover member to respectively release the cover and interengage the cover with the device. The clamping rings are pivotally interconnected with the device such that lateral outward displacement of the clamping rings is accompanied by radial outward displacement of the pivot axis to provide clearance for removal of the cover member. The clamping ring members are guided during a portion of the lateral inward and outward displacement thereof, and the guide arrangement supports the clamping rings in the laterally outermost positions thereof. A safety interlock is provided between the displaceable ends of the clamping rings and the cover member to prevent lateral outward displacement of the clamping rings to release the cover member until the interior of the pressure device has been vented to atmosphere. For this purpose, the ends of the rings are provided with pins circumferentially interengaged by a latch plate, and the cover member is provided with a removable bleed valve which blocks displacement of the latch plate from the pins until the vessel has been vented and the valve removed from the cover member.

31 Claims, 9 Drawing Figures

CLOSURE ARRANGEMENT FOR PRESSURE DEVICE

BACKGROUND OF THE INVENTION

The present invention relates to the art of removable covers for pressure devices and, more particularly, to an improved arrangement for releaseably clamping a removable cover on a pressure device.

It is of course well known to provide an opening into a pressure device with a removable cover to enable access to the interior of the device for a variety of purposes. Such a pressure device may be a tank, pipeline, autoclave, or other processing, storage or fluid delivering equipment wherein a high pressure, or vacuum, exists during use thereof. Such pressure devices generally require frequent access to the interior thereof and, accordingly, it becomes desirable to provide for such access to be easily, quickly and safely obtained.

In certain closure devices heretofore provided for an access opening to such a pressure device, the pressure device opening and the cover member for closing the latter are provided with radially projecting circumferential flanges which are facially and clampingly interengaged by a circumferentially extending clamping ring arrangement. When it is desired to gain access to the interior of the pressure device through the opening, the clamping components are displaced laterally outwardly of the flanges to release the cover for removal from the device and, when it is again desired to close the opening, the cover is repositioned thereacross and the clamping components are displaced laterally inwardly of the flanges to interengage the cover and pressure device. In connection with the lateral outward displacement of the clamping components to release the cover, it is of course necessary to first vent the interior of the pressure device in that the slightest pressure therein, either above or below atmospheric pressure, can result in sudden axially outward displacement of the cover member upon release of the clamping assembly. Such sudden displacement of the cover member is of course dangerous and undesirable, both from the standpoint of the safety of personnel and from the standpoint of potential damage to the component parts of the closure assembly. Accordingly, it becomes desirable to positively prevent the occurrence of such sudden displacement of the cover and the disadvantages attendant thereto.

Often, there are space limitations which restrict the extent to which the clamping ring components can project laterally outwardly of the opening into the pressure device. In any event such lateral projection of the clamping ring members can be hazardous to personnel whereby it is desirable to minimize the extent of projection. In clamping arrangements including a pair of semicircular clamping members in which the lower ends of the clamping members are pivotally interconnected with the pressure vessel, the lateral outward displacement of the clamping ring members required to provide clearance for axial displacement of the cover member from the pressure device can result in excessive lateral outward projection of the clamping ring members. Moreover, the acutating mechanisms for displacing the clamping ring members have heretofore been relied upon to support the clamping ring members in their laterally outermost positions. As a result thereof, together with the extent of displacement required with respect to the clamping ring members, the actuating mechanisms and the mounting arrangements therefor have to be structurally massive to provide the necessary strength and structural integrity for the ring displacing and supporting functions. Furthermore, the actuating mechanisms have been relied upon to maintain the clamping ring members in axial alignment with the flanges of the cover member and pressure device and, when the clamping ring members are in the laterally outermost positions thereof, stability with respect to preventing axial displacement thereof and thus misalignment, is not adequately provided for by the actuating mechanism.

SUMMARY OF THE INVENTION

In accordance with the present invention, a closure for a pressure device is provided which advantageously minimizes or overcomes the foregoing and other disadvantages of arrangements heretofore provided. More particularly in this respect, a clamping arrangement is provided for interengaging a cover member with a pressure device in a manner which positively precludes release of the clamping interengagement without first venting the interior of the pressure device to atmosphere. Preferably, this is achieved by an interlocking arrangement between the cover member and the clamping device in which the latter is latched against displacement to release the cover member and in which the latch cannot be physically displaced from the clamping device until the interior of the pressure vessel has been vented. In a preferred embodiment, such interlocking is achieved by a bleed valve associated with the cover member and which valve must be displaced to a position positively providing for venting to have taken place before the latch can be physically displaced to release the clamping device.

In accordance with another aspect of the present invention, the clamping arrangement includes a pair of clamping ring members, and the latter members and the pressure device are provided with interengaging guide and support components cooperable during lateral outward displacement of the clamping ring members to maintain the clamping ring members in a desired axial position relative to the pressure device and to support the clamping ring members in their laterally outermost positions. In accordance with yet another aspect of the invention, the clamping ring members are pivotally mounted on the pressure device in a manner whereby the pivot axis therefor is displaced radially outwardly of the pressure device during lateral outward displacement of the clamping ring members. Such displacement of the pivot axis advantageously provides for achieving the required clearance for removal of the cover member with minimum lateral outward projection of the clamping ring members. Furthermore, the guidance feature and the pivotal support arrangement advantageously provide for reducing the size of the actuating mechanisms for the clamping ring members and the mounting structures therefor and for the clamping ring members, thus promoting compactness of the overall size of the closure assembly and a more economical construction thereof, while maintaining the desired strength and efficiency in clamping ring operation.

It is accordingly an outstanding object of the present invention to provide an improved closure for an opening in a pressure device and which closure is of the character including a flanged cover member clampingly interengaged with a flange bounding the opening in the pressure device.

Another object is the provision of a closure of the foregoing character wherein release of the clamping interengagement to release the cover member is positively precluded until the interior of the pressure device has been vented to atmosphere.

A further object is the provision of a closure of the foregoing character in which cover clamping components are locked against displacement to release the cover member by a removable latch, and wherein the removal of the latch requires displacement of a venting valve component to a position which assures venting of the interior of the pressure vessel.

Yet another object is the provision of a closure of the foregoing character having an improved arrangement for supporting and displacing clamping components between clamping and released positions with respect to the cover member.

Still another object is the provision of a closure of the foregoing character providing lateral guidance and axial positioning of the clamping components during displacement thereof between cover clamping and releasing positions, and providing support therefor when in the cover releasing position.

Still a further object is the provision of a closure of the foregoing character which is structurally simple and compact, economical to produce, efficient in operation, and which provides improved safety for personnel during removal of the cover member.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
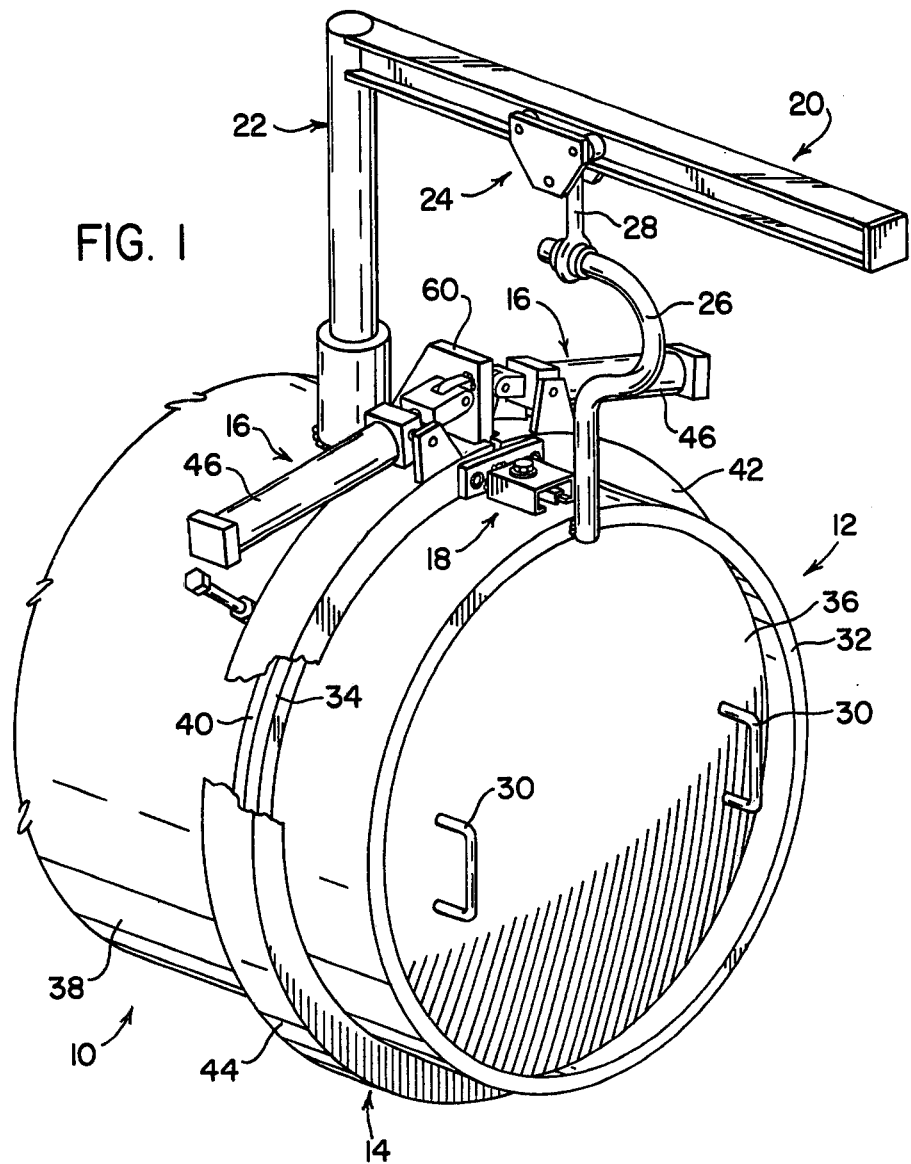
FIG. 1 is a perspective view of a portion of a pressure device and a closure therefor in accordance with the present invention.

Referring now in greater detail to the drawings wherein the showings are for the purpose of illustrating a preferred embodiment of the invention only, and not for the purpose of limiting the invention, FIG. 1 illustrates a portion of a pressure device 10 which could be a pipeline, autoclave, or the like, and which has an opening thereinto closed by a removable cover member 12 which is releasably interengaged with pressure device 10 by a clamping ring assembly 14. As set forth more fully hereinafter, the clamping ring assembly is adapted to be actuated between clamping and released positions by hydraulic actuating units 16, and actuation of the clamping ring assembly to release cover member 12 for removal is controlled by a latch and bleed valve assembly 18 mounted on cover member 12. Upon release of cover member 12, as described hereinafter, the cover member is supported for displacement away from the opening in pressure device 10 by means of an overhead support and guide rail 20 mounted on pressure device 10 by means of a support post 22, and a roller supported trolley 24 displaceable along guide rail 20 and supporting cover member 12 in suspension. In this respect, a support member 26 is welded on cover member 12, and a support arm 28 interconnects support member 26 with trolley 24. Cover member 12 is provided with a pair of handles 30 to facilitate displacement of the cover member along guide rail 20 toward and away from pressure device 10.

In the embodiment illustrated, and as best seen in FIGS. 1-4 of the drawing, cover member 12 includes an annular outer wall 32 having a radially outwardly projecting circumferential flange 34 at the inner end thereof, and a dish-shaped end wall 36 within wall 32 and peripherally welded thereto. Pressure device 10 has an opening thereinto defined by a cylindrical wall 38 bounded at its outer end by a radially outwardly projecting circumferential flange 40 which is facially engaged by flange 34 of cover member 12 when the latter is positioned to close the opening. The axially inner end of outer wall 32 of cover member 12 is provided on the radially inner side thereof with a circumferentially continuous resilient metal sealing plate member 33. Plate 33 is welded to wall 32 and extends axially inwardly beyond the axially inner end of wall 32 so as to overlie the inner surface of wall 38 of pressure device 10 when cover member 12 is mounted thereon. Sealing plate 33 is provided with a circumferentially continuous outwardly open recess 35 adjacent the axially inner end thereof and which recess receives a circumferentially continuous resilient O-ring 37. O-ring 37 is radially compressed between recess 35 and the inner surface of wall 38 of pressure device 10 to provide a seal between the cover member and the opening into the pressure device when the cover member is mounted thereon. The resiliency of plate 33 advantageously provides for the latter to be radially pressed toward the inner surface of wall 38 by the pressure within pressure device 10, whereby sealing is progressively enhanced in response to progressively increasing pressures within device 10.

Figure 2:
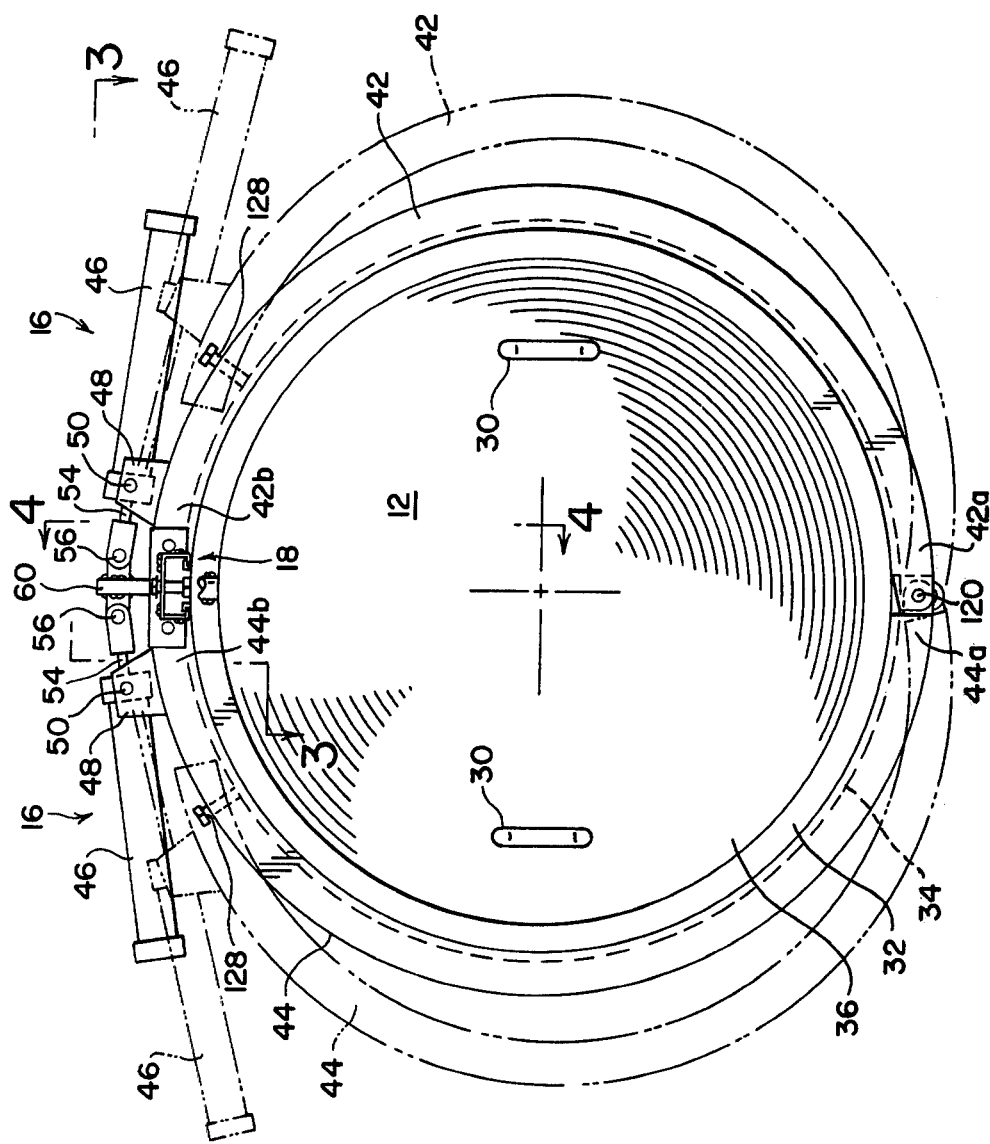
FIG. 2 is a front elevation view of the closure.

Clamping ring assembly 14 by which cover member 12 is removably interengaged with pressure device 10 is comprised of a pair of clamping ring members 42 and 44 having corresponding lower ends 42a and 44a pivotally mounted on pressure device 10, as described hereinafter, whereby the clamping ring members are each laterally displaceable toward and away from pressure device 10 and flanges 34 and 40. Clamping ring members 42 and 44 are U-shaped in cross-section, and it will be appreciated that such contour provides for the clamping ring members to clampingly interengage the axially opposite sides of flanges 34 and 40 when cover member 12 is positioned to close the opening into pressure device 10. The latter positions of the clamping ring members are shown by the solid line positions thereof in FIG. 2. Lateral outward displacement of clamping ring members 42 and 44 from the solid line position to the broken line position shown in FIG. 2 provides for the clamping ring members to clear flanges 34 and 40 to enable axial displacement of cover member 12 away from the pressure device.

Figure 3:
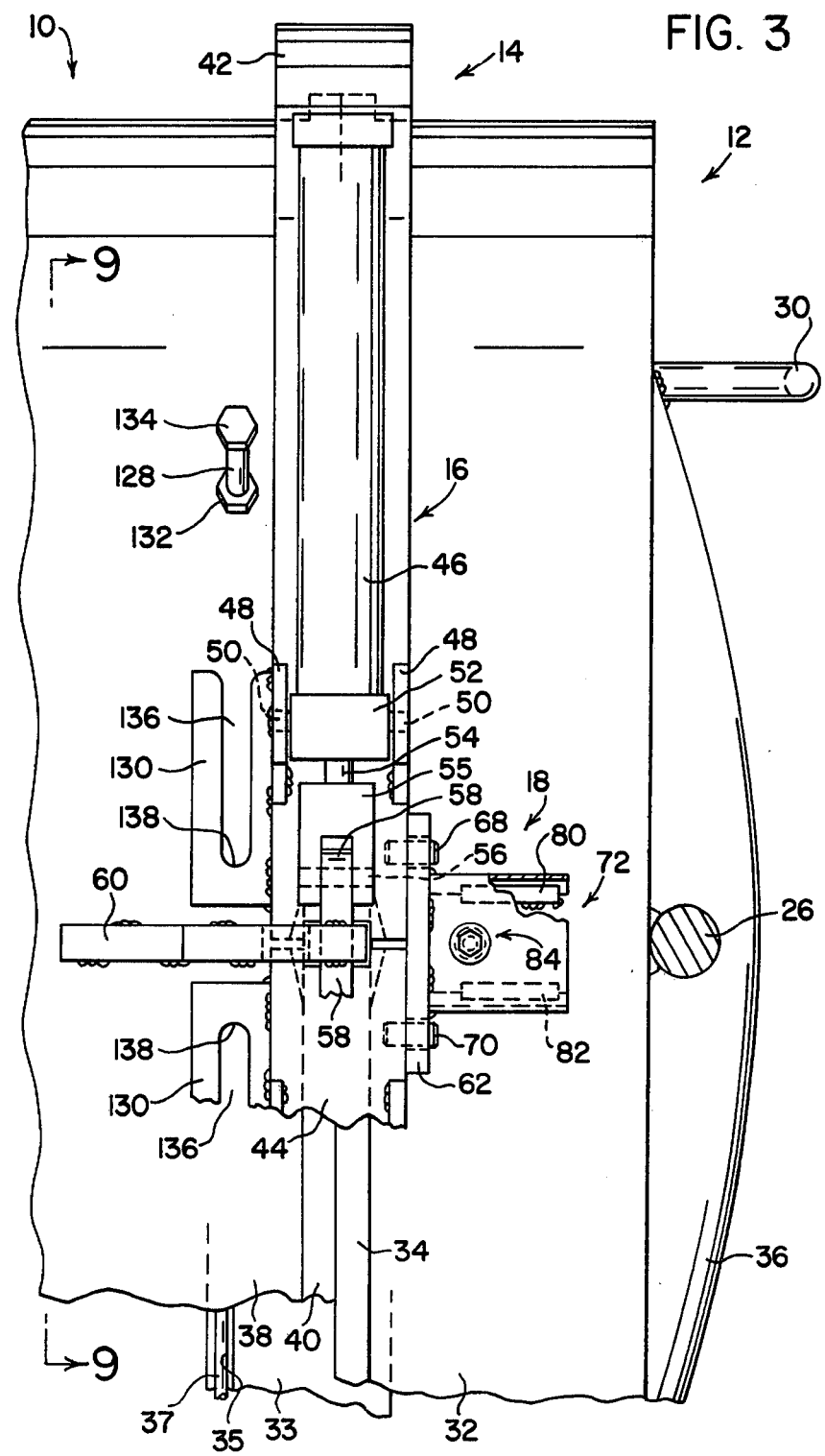
FIG. 3 is a top view of the closure, partially in section, as seen along line 3—3 in FIG. 2.
Figure 4:
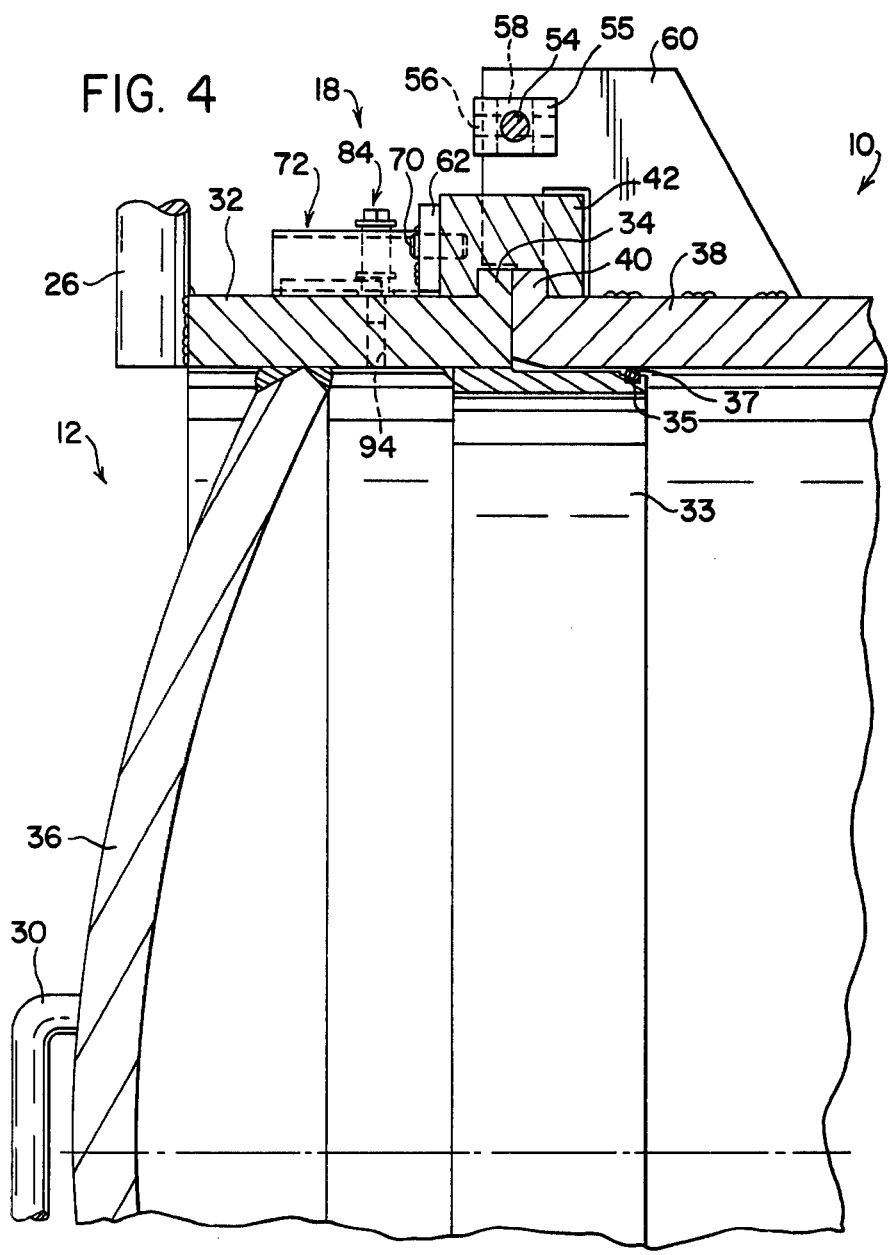
FIG. 4 is an enlarged sectional elevation view of a portion of the closure and pressure device taken along line 4—4 in FIG. 2.
Figure 5:
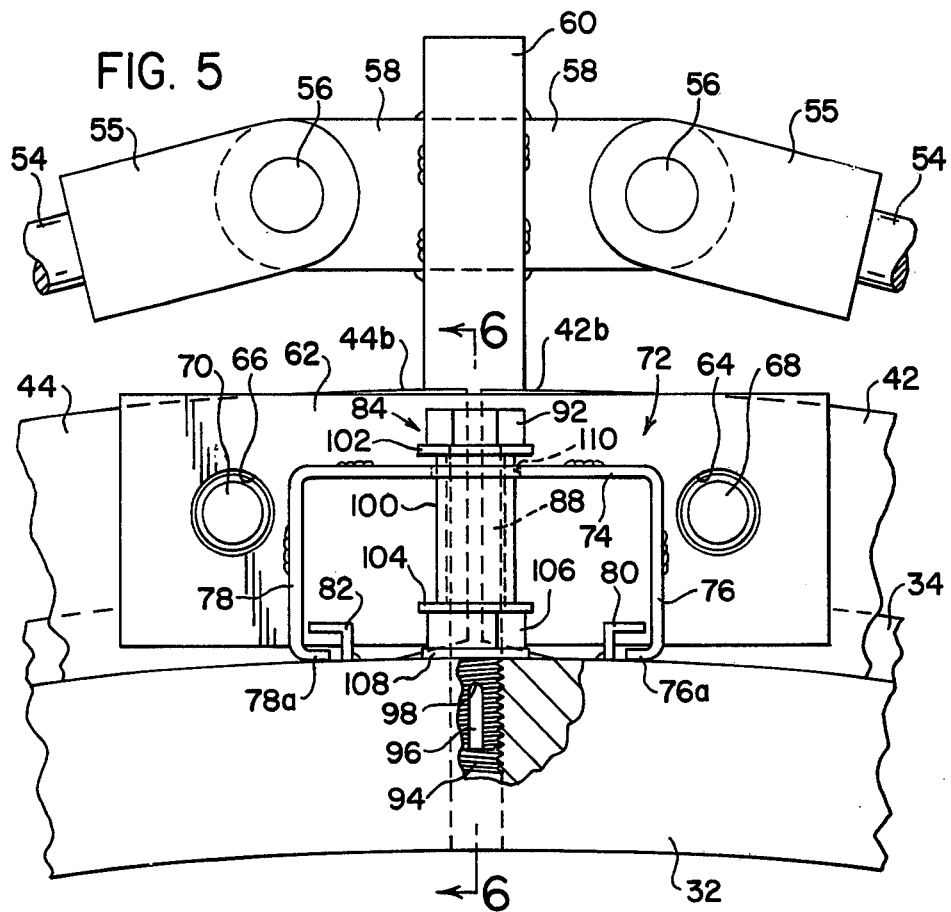
FIG. 5 is an enlarged front elevation view of the latch and bleed valve assembly for the closure.

Lateral inward and outward displacement of clamping ring members 42 and 44 between the clamping and released positions thereof with respect to cover member 12 is achieved by hydraulic actuating units 16, each of which is interconnected with pressure device 10 and with a corresponding one of the clamping rings 42 and 44. More particularly in this respect, as best seen in FIGS. 2, 3 and 5, each of the actuating units 16 includes a cylinder member 46 having its inner end pivotally interconnected with the corresponding one of the clamping rings 42 and 44. Such pivotal interconnection includes a pair of support plates 48 welded on the corresponding clamping ring and between which the inner end of cylinder 46 is disposed, and a pair of pivot pins 50 supported on a collar 52 on the cylinder and extending through openings therefor in plates 48. Each cylinder 46 supports a reciprocable piston therein, not shown, and each unit 16 further includes a piston rod 54 having an inner end in cylinder 46 and connected to the piston and having an outer end provided with a mounting head 55. The outer end of each piston rod is pivotally interconnected with pressure device 10 by means of a pivot pin 56 extending through head 55 and a corresponding arm 58 on a mounting plate 60 welded to pressure device 10. It will be appreciated that each of the cylinders 46 is connected to a suitable source of hydraulic fluid, not shown, through control valves operable to provide fluid flow so as to displace the corresponding piston in axially opposite directions therein to achieve extension and retraction of piston rod 54 relative to cylinder 46. It will be further appreciated that fluid flow to achieve extension of the piston rods relative to the cylinders displaces the corresponding one of the clamping rings 42 and 44 laterally outwardly from the solid line to the broken line positions thereof in FIG. 2, and that fluid flow to achieve retraction of the piston rods causes displacement of the clamping rings laterally inwardly into clamping interengagement with flanges 34 and 40.

In accordance with one aspect of the present invention, lateral outward displacement of clamping ring members 42 and 44 to achieve release of cover member 12 is positively prevented by latch and bleed valve assembly 18. More particularly in this respect, and as best seen in FIGS. 3-6 of the drawing, the latch and bleed valve assembly includes a latch plate 62 parallel to upper ends 42b and 44b of the clamping ring members and provided with a pair of circumferentially spaced apart openings 64 and 66 which extend therethrough and respectively overlie ends 42b and 44b. Ends 42b and 44b are provided with axially extending cylindrical pins 68 and 70, respectively, which are secured such as by welding in openings provided therefor in the corresponding clamping ring member end. Pin 68 extends through opening 64 and pin 70 extends through opening 66, whereby the pins and latch plate interengage ends 42b and 44b and thus the corresponding clamping ring members against lateral outward displacement to the releasing positions of the latter.

In order to release clamping ring ends 42b and 44b for lateral outward displacement, latch plate 62 must be displaced axially away from the clamping ring ends and, for this purpose, latch plate 62 is welded on the front of carrier plate 72 which is axially slidably supported on wall 32 of cover member 12. Carrier plate 72 includes a top wall 74 radially spaced from the outer surface of cover wall 32, and opposite side walls 76 and 78 extending downwardly from top wall 74 and terminating in corresponding inwardly extending flanges 76a and 78a which slidably engage the outer surface of wall 32. A pair of angle members 80 and 82 are welded to cover wall 32 inwardly adjacent flanges 76a and 78a, respectively, and extend upwardly and outwardly of the corresponding flange to laterally and radially capture carrier plate 72.

Figure 6:
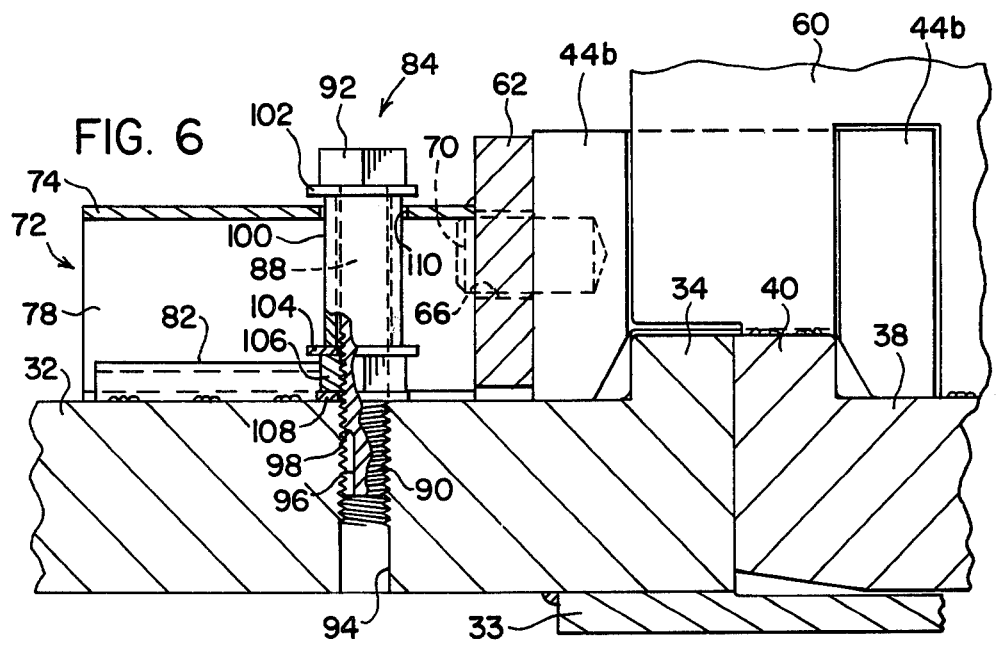
FIG. 6 is a sectional elevation view of the latch and bleed valve assembly taken along line 6—6 in FIG. 5.

When latch plate 62 is in the latched position with respect to pins 68 and 70, carrier plate 72 and thus the latch plate are interlocked with cover member 12 so as to prevent displacement of latch plate 62 to the unlatched position relative to pins 68 and 70 until the interior of pressure device 10 has been vented to atmosphere. In the present embodiment, as best seen in FIGS. 5 and 6, such interlocking is achieved by means of a bleed valve device 84 removably interengaged with cover member 12 and interengaging with carrier plate 72 to physically block displacement of the carrier plate and latch plate in the direction axially away from the clamping ring members. Bleed device 84 includes a valve element in the form of a bolt member having a shank portion 88 which is threaded at its lower end 90 and provided at its outer end with a tool head 92. Wall 32 of cover member 12 is provided with a radial passageway 94 which extends therethrough axially inwardly of end wall 36 of the cover member so as to communicate with the interior of pressure device 10, and passageway 94 is internally threaded to receive threaded lower end 90 of bolt shank 88. The lower end of the threaded portion of the bolt shank is provided with an axially extending recess 96 having an upper end 98 disposed below the outer surface of cover wall 32 when the bleed valve device is in its closed position closing passageway 94, as shown in FIGS. 5 and 6. As described more fully hereinafter, upper end 98 of the recess is disposed radially above the outer surface of cover wall 32 to communicate the interior of pressure device 10 with atmosphere when the bleed valve device is opened. Bleed valve device 84 further includes a sleeve member 100 surrounding shank 88 and axially captured thereon between an apertured washer 102 engaging under head 92 and a second apertured washer 104 overlying a nut 106 threadedly received on threaded portion 90 of shank 88. Nut 106 provides a stop member to limit radial inward displacement of the bleed valve device, and a resilient washer 108 surrounds lower portion 90 of shank 88 and is interposed between nut 106 and the outer surface of cover wall 32 to seal the bleed valve device against leakage through passageway 94 when the bleed valve device is closed. The upper end of the bleed valve device, as defined by the upper end of shank 88 and sleeve 100, extends through a circular opening 110 in top wall 74 of carrier plate 72, which opening 110 is in alignment with passageway 94 when latch plate 62 is in latching engagement with pins 68 and 70. Accordingly, it will be appreciated that displacement of latch plate 62 to the unlatched position thereof with respect to pins 68 and 70 is physically blocked by interengagement between carrier plate 72 and bleed valve device 84.

In order to release latch plate 62 for displacement to the unlatched position thereof, bleed valve device 84 must be rotated so as to withdraw lower end 90 of shank 88 completely out of passageway 94 in cover member 12. The length of lower end 90 disposed in passageway 94 and the axial length of recess 96 are such that upper end 98 of the recess extends above the outer surface of cover wall 32 before lower end 90 is completely withdrawn from passageway 94. Thus, the interior of pressure device 10 is positively vented to atmosphere before bleed valve device 84 is completely removed from interengagement with cover member 12 and, accordingly, the interior of the pressure device is vented before latch plate 62 can be displaced to the unlatched position thereof with respect to pins 68 and 70. When bleed device 84 has been completely removed from interengagement with cover member 12, carrier plate 72 and thus latch plate 62 can be displaced axially away from the clamping ring members to disengage the latch plate from pins 68 and 70. Washers 102 and 104 advantageously radially capture the bleed valve device with respect to carrier plate 72 when the bleed valve device is in its removed position, thus to avoid injury to personnel should bleeding be incomplete causing the valve to pop upwardly upon removal.

When latch plate 62 is displaced to the unlatched position thereof in the foregoing manner, it will be appreciated that ends 42b and 44b and thus clamping ring members 42 and 44 are freed for lateral outward displacement to the releasing positions of the clamping ring members, such displacement being achieved by hydraulic actuating units 16 as described hereinabove. Following removal of cover member 12 and subsequent replacement thereof against flange 40 to close the opening in pressure device 10, actuating units 16 are operated to displace clamping ring members 42 and 44 laterally inwardly into clamping interengagement with flanges 34 and 40. The latter displacement positions ends 42b and 44b in circumferentially opposed relationship, whereby pins 68 and 70 are positioned to receive latch plate 62. Carrier plate 72 is then displaced axially toward the clamping ring members for pins 68 and 70 to be received in openings 64 and 66, which displacement aligns bleed valve device 84 with passageway 94 in cover wall 32. Bleed valve device 84 is then rotated to interengage lower end 90 in passageway 94 to the extent required to sealingly close the passageway, whereby pressure device 10 is ready for use and the clamping ring members are locked against lateral outward displacement relative to the pressure device.

Figure 7:
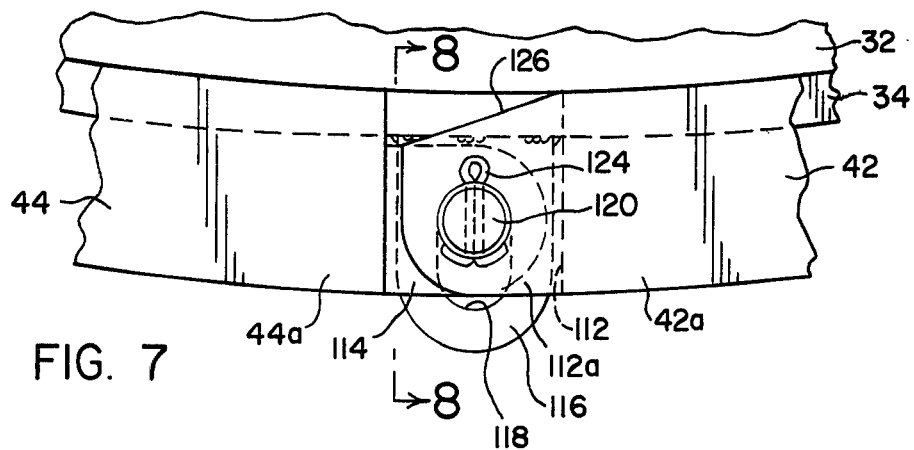
FIG. 7 is an enlarged front elevation view showing the pivotal mounting of the clamping members of the closure.
Figure 8:
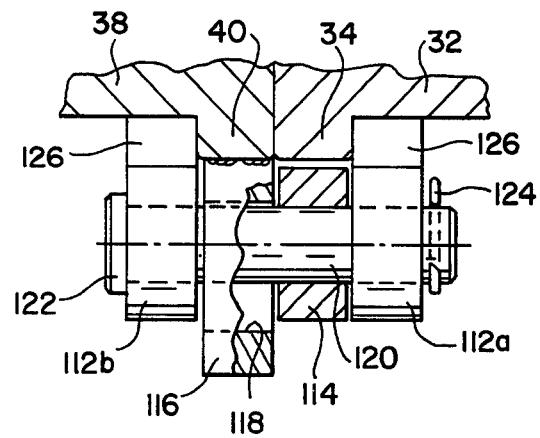
FIG. 8 is a sectional elevation view of the pivotal mounting taken along line 8—8 in FIG. 7; and, FIG. 9 is an elevation view of the guide assembly for the clamping members as seen along line 9—9 in FIG. 3.

As mentioned hereinabove, lower ends 42a and 44a of clamping ring members 42 and 44 are pivotally interconnected with pressure device 10 to enable the lateral outward and inward displacement of the clamping rings. While such pivotal interengagement of the lower ends could be about a fixed pivot axis, it is preferred to provide for the pivot axis, and thus the lower ends of the clamping ring members, to be radially downwardly displaceable during lateral displacement of the clamping ring members so as to minimize the extent of lateral displacement of the clamping ring members required to provide clearance for axial displacement of cover member 12 therepast. FIGS. 7 and 8 of the drawing illustrate a preferred mounting arrangement for this purpose. In this respect, and with reference to the latter Figures, lower end 42a of clamping ring member 42 is provided with a circumferentially extending recess 112 opening radially therethrough and providing axially inner and outer legs 112a and 112b, respectively, and lower end 44a of clamping ring member 44 is provided with an axially narrow circumferentially extending projection 114 received in recess 112 adjacent leg 112a thereof, whereby ends 42a and 44a are circumferentially overlapped. A mounting lug 116 is welded on flange 40 of pressure device 10 and extends radially downwardly therefrom into the portion of recess 112 between projection 114 and leg 112b of the recess. Mounting lug 116 is provided with a pivot pin slot 118, and ends 42a and 44a of the clamping ring members are pivotally interengaged with one another and with mounting lug 116 by means of a common pivot pin 120 which extends through slot 118 and through pivot pin openings in projection 114 on end 44a and legs 112a and 112b on end 42a. Pivot pin 120 is releaseably retained in interengagement with ends 42a and 44a and mounting lug 116 by providing one end of the pin with a head 122 and providing the other end with a removable retaining pin 124.

Pin slot 118 in mounting lug 116 has a lateral or circumferential dimension corresponding to the diameter of pivot pin 120 and has a radial length greater than the diameter of the pivot pin, thus to permit radial upward and downward displacement of pivot pin 120 and thus the pivot axis of the clamping ring members relative to pressure device 10. Accordingly, it will be appreciated that when the clamping ring members are in clamping interengagement with flanges 34 and 40 of the cover member and the pressure device, pivot pin 120 is disposed at the radially upper end of slot 118 in mounting lug 116, as shown in FIGS. 7 and 8. During lateral outward displacement of the locking ring members toward the broken line position thereof in FIG. 2, slot 118 allows pivot pin 120 and thus lower ends 42a and 44a of the clamping ring members to move downwardly relative to pressure device 10. Such downward movement provides for the radially inner sides of the lower ends of the clamping ring members to move downwardly below flanges 34 and 40 to provide radial clearance for axial displacement of the cover member away from pressure device 10. Preferably, in order to minimize the extent of downward movement required for the latter purpose, the radially inner ends of legs 112a and 112b defining recess 112 in lower end 42a are beveled as indicated by numeral 126. Downward displacement of lower ends 42a and 44a is of course accompanied by downward displacement of upper ends 42b and 44b of the clamping ring members during lateral outward displacement thereof relative to flanges 34 and 40, but it will be appreciated that such downward displacement of the lower and upper ends of the clamping ring members, combined with lateral outward displacement of the upper ends, provides for the necessary radial clearance to be achieved with considerably less laterally outward displacement of the clamping ring members than would be required if the pivot axis at the lower ends of the clamping rings were radially fixed. Such minimizing with respect to lateral outward displacement of the clamping ring members advantageously enables the use of a structurally simpler and smaller size actuating arrangement for the clamping ring members, and reduces the extent of lateral projection of the clamping ring members in the released positions thereof, thus promoting compactness with regard to space requirements and safety for personnel.

Figure 9:
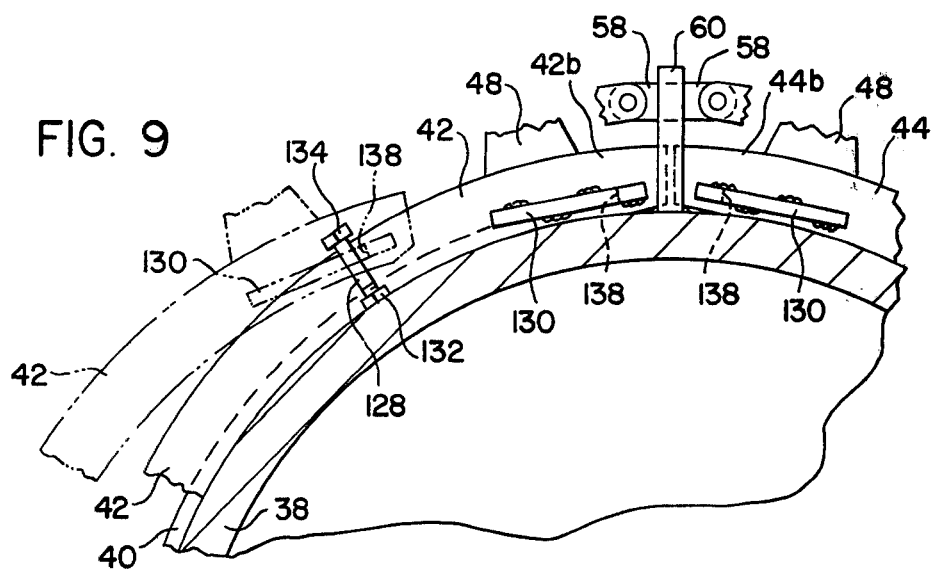

In accordance with another aspect of the present invention, lateral outward displacement of clamping ring members 42 and 44 from the clamped to the released positions thereof is accompanied by guidance of the clamping ring members relative to pressure device 10 as the clamping ring members approach the laterally outermost positions thereof. In accordance with the preferred embodiment, as best seen in FIGS. 2, 3 and 9 of the drawing, such guidance is achieved by providing pressure device 10 with a pair of guide pins 128, each axially adjacent one of the clamping ring members 42 and 44, and by providing the latter with guide plate members 130. Guide pins 128 are each mounted on pressure device 10 at a location of about 40° to 50° from a vertical plane through the axis of the opening into the pressure device and in the direction of lateral outward displacement of the corresponding clamping ring member. Guide plates 130 are mounted on the corresponding clamping ring member adjacent the upper ends thereof and are adapted to initially interengage with the corresponding guide pin just before ends 42b and 44b of clamping ring members 42 and 44 clear contact with flange 34 on cover member 12. In the preferred embodiment, guide pins 128 project radially outwardly from pressure device 10 and have radially inner ends threadedly interengaged with a corresponding nut 132 which is welded to wall 38 of the pressure device. This facilitates removal of the pins for replacement purposes and, in this respect, each pin is preferably provided with a tool head 134 at the radially outer end thereof.

Guide plates 130 are U-shaped plates welded to the axially inner side of the corresponding clamping ring member, the U-shaped configuration providing each of the plates 130 with an elongated guide recess 136. Guide recesses 136 open toward the corresponding guide pin 128 and have inner ends 138. It will be appreciated from the foregoing description that lateral outward displacement of clamping ring members 42 and 44 carries guide plates 130 toward the corresponding guide pins 128, and that continued lateral outward displacement brings the entrance ends of recesses 136 into positions receiving guide pins 128. Thereafter, during further laterally outward displacement of the clamping ring members, the latter are guided by interengagement between the pins and recesses and are stabilized thereby against axial displacement relative to pressure device 10. When the clamping ring members reach the laterally outermost positions thereof, as shown by broken lines in FIGS. 2 and 9, pins 128 engage inner ends 138 of the guide plate recesses, whereby the clamping ring members are thereafter supported in their laterally outermost positions by interengagement between the corresponding guide plate and guide pin until such time as lateral inward displacement thereof is required to clampingly interengage cover member 12 with pressure device 10.

Guidance of the clamping ring members in the foregoing manner advantageously maintains the latter in a desired position of axial alignment with the flanges on the pressure device and cover member following removal of the cover member and during maintenance or other operations which take place with respect to the pressure device while the cover member is removed. Following repositioning of the cover member to close the opening into the pressure device, the guide pins and guide plates assure initial movement of the clamping ring members laterally inwardly toward flanges 34 and 40 in proper alignment for interengagement therewith. Moreover, such guidance prevents any axial displacements of the clamping ring members both while the members are in the outermost positions thereof and during initial inward movement of the clamping ring members. Such axial displacement can impose undesirable forces on the component parts providing the pivotal mounting at the lower ends of the clamping ring members, and on the component parts of the hydraulic actuating units. Avoiding such forces by guidance according to the present invention is not only advantageous from the standpoint of minimizing wear and/or damage of such component parts, but also minimizes strength and size requirements with regard thereto. The guide pin and guide plate arrangements also advantageously serve to support clamping ring members 42 and 44 in the laterally outermost positions thereof, thus to relieve any stresses or undesirable forces which would otherwise be imposed on the actuating units in supporting the clamping ring members in the outermost positions thereof during periods of cover removal.

While particular emphasis has been placed herein on the structure of component parts of the preferred embodiment and structural interrelationships therebetween, it will be appreciated that many embodiments of the invention can be made, and that many changes can be made in the preferred embodiments herein illustrated and described without departing from the principles of the present invention. For example, the clamping ring actuator units could be screw operated as opposed to hydraulically operated piston and cylinder units. With regard in particular to the latching and bleed valve assembly, it will be appreciated that other structural arrangements as well as modifications of the structure herein illustrated and described can readily be provided for achieving the desired interlock of the clamping members to prevent lateral outward displacement thereof in the absence of positive venting of the interior of the pressure device. In connection with the arrangement herein illustrated and described, for example, the latching pins could be provided on the latching plate to extend into pin receiving openings in the ends of the clamping ring members and, as opposed to providing a carrier plate for the latch plate, the bleed valve alone could be positioned on cover member 12 to block axial displacement of the latch plate until the bleed valve is removed. Still further, in connection with the embodiment herein illustrated, the outer end of the bleed valve device could be provided with a reduced diameter portion below the top wall of the carrier plate, and the top wall of the carrier plate could be provided with an axially extending narrow slot opening into the larger opening through which the outer end of the bleed valve device extends. Such an arrangement would provide for outward displacement of the bleed valve device to bring the small diameter portion thereof into the opening in the top wall of the carrier plate, venting of the interior being achieved before the small diameter portion reaches the opening. The narrow slot in the top wall of the carrier plate would then enable axial displacement of the carrier plate and thus the latch plate relative to the bleed valve and to the unlatched position of the latch plate. Thus, the bleed valve would not have to be completely removed from cover member 12 as in the preferred embodiment. It is only necessary in accordance with this aspect of the present invention that the bleed valve device and the latching arrangement, regardless of the respective structures thereof, have a cooperable structural relationship which requires positive venting of the interior of the pressure device to atmosphere before the clamping device can be unlatched for displacement to the cover releasing position thereof.

The foregoing and other modifications of the preferred embodiment, as well as other embodiments of the present invention, will be obvious and suggested to those skilled in the art from the foregoing description of the preferred embodiment, whereby it is to be distinctly understood that the descriptive matter herein is to be interpreted merely as illustrative of the present invention and not as a limitation.

Having thus described the invention, it is claimed:

1. A closure for a pressure device having an opening bounded by a radially projecting circumferential flange comprising, a cover member having a radially projecting circumferential flange axially engaging said flange on said pressure device, clamping ring means releaseably interengaging said flanges on said pressure device and said cover member, said clamping ring means extending circumferentially about said flanges and having circumferentially adjacent end means, said ring means being displaceable laterally relative to said flanges between first and second positions in which said ring means respectively interengage said cover member and said pressure device and release said cover member for removal from said pressure device, means for displacing said clamping ring means between said first and second positions, releaseable latching means interengaging said end means of said ring means in said first position against displacement toward said second position, and means including bleed valve means on one of said cover member and pressure device preventing release of said latch means until the interior of said pressure device is vented to atmosphere.

2. A closure according to claim 1, wherein said latch means includes pin means on said end means of said ring means and latch plate means engaging said pin means.

3. A closure according to claim 2, wherein said means on said one of said cover member and pressure device includes carrier means supporting said latch plate means for movement between pin engaging and releasing positions relative to said pin means, and bleed valve means including means interengaging with said carrier means to releaseably hold said latch plate means in said pin engaging position.

4. A closure according to claim 3, wherein said bleed valve means includes valve member means removably interengaged with said one of said cover member and pressure device, said valve member means being removable to release said carrier means and latchplate means for displacement to said pin releasing position.

5. A closure according to claim 4, wherein said cover member includes an annular circumferentially extending wall having axially outer and inner ends, said cover member flange being at said inner end, said pressure device including annular wall means providing said opening, said wall and said wall means having corresponding inner surfaces, an annular resilient metal sleeve mounted on the inner surface of said wall and extending axially inwardly from said inner end thereof to overlie the inner surface of said wall means, said sleeve including a circumferential recess therein opening radially toward said inner surface of said wall means, and an annular sealing member carried in said recess and sealingly engaging said inner surface of said wall means.

6. A closure according to claim 1, wherein said clamping ring means includes a pair of clamping ring members having corresponding first and second ends, means pivotally interconnecting said first ends with said tubular member, and said second ends providing said circumferentially adjacent end means.

7. A closure according to claim 6, and interengaging guide means on each said ring member and said pressure device interengaging during movement of said clamping ring means between said first and second positions.

8. A closure according to claim 7, wherein said guide means includes radially extending guide pin means on said pressure device for each said clamping ring member and guide plate means on each said clamping ring member having a circumferentially extending slot receiving the corresponding guide pin means.

9. A closure according to claim 8, wherein said means for displacing said clamping ring means includes a hydraulic piston and cylinder unit for each clamping ring member, each said unit including a cylinder member pivotally mounted on the corresponding clamping ring member and a piston rod extending from said cylinder member toward said second end of the corresponding clamping ring member, each said piston rod having an outer end pivotally connected to said pressure device at a location adjacent said second ends when said clamping ring members interengage said cover member and said pressure device.

10. A closure according to claim 6, wherein said latch means includes a pin on the second end of each said clamping ring member, a latch plate having pin openings for said pins, and means on said one of said cover member and pressure device supporting said latch plate for displacement between pin engaging and releasing positions.

11. A closure according to claim 10, wherein said means supporting said latch plate includes carrier plate means, said bleed valve means including means interengaging with said carrier plate means to releaseably hold said latch plate in said pin engaging position.

12. A closure according to claim 11, wherein said one of said cover member and pressure device includes a bleed passageway opening radially therethrough, said bleed valve means including valve element means removably supported in said passageway and having a radially outer end, said carrier plate means having an opening therethrough aligned with said passageway when said latch plate is in said pin engaging position, and said outer end of said valve element means extending through said opening to interengage with said carrier plate means to hold said latch plate in said pin engaging position.

13. A closure according to claim 12, and sealing means between said cover member and said pressure device.

14. A closure according to claim 12, wherein said means for displacing said clamping ring means includes a hydraulic piston and cylinder unit for each clamping ring member, each said unit including a cylinder member pivotally mounted on the corresponding clamping ring member and a piston rod extending from said cylinder member toward said second end of the corresponding clamping ring member, each said piston rod having an outer end pivotally connected to said pressure device at a location adjacent said second ends when said clamping ring members interengage said cover member and said pressure device.

15. A closure according to claim 12, and interengaging guide means on each said ring member and said pressure device interengaging during movement of said clamping ring means between said first and second positions.

16. A closure according to claim 15, wherein said guide means includes radially extending guide pin means on said pressure device for each said clamping ring member and guide plate means on each said clamping ring member having a circumferentially extending slot receiving the corresponding guide pin means.

17. A closure according to claim 16, wherein said means pivotally interconnecting said first ends of said clamping ring members with said pressure device includes a common pivot pin pivotally interconnecting said first ends, and lug plate means mounted on said tubular member and having a radially elongated slot therethrough radially slidably receiving said pivot pin.

18. A closure according to claim 17, wherein said means for displacing said clamping ring means includes a hydraulic piston and cylinder unit for each clamping ring member, each said unit including a cylinder member pivotally mounted on the corresponding clamping ring member and a piston rod extending from said cylinder member toward said second end of the corresponding clamping ring member, each said piston rod having an outer end pivotally connected to said pressure device at a location adjacent said second ends when said clamping ring members interengage said cover member and said pressure device.

19. A closure according to claim 18, and sealing means between said cover member and said pressure device.

20. A closure according to claim 6, wherein said means pivotally interconnecting said first ends of said clamping ring members with said pressure device includes a common pivot pin pivotally interconnecting said first ends, and lug plate means mounted on said tubular member and having a radially elongated slot therethrough radially slidably receiving said pivot pin.

21. A closure according to claim 20, and interengaging guide means on each said ring member and said pressure device interengaging during movement of said clamping ring means between said first and second positions.

22. A closure according to claim 21, wherein said guide means includes radially extending guide pin means on said pressure device for each said clamping ring member and guide plate means on each said clamping ring member having a circumferentially extending slot receiving the corresponding guide pin means.

23. A closure according to claim 22, wherein said means for displacing said clamping ring means includes a hydraulic piston and cylinder unit for each clamping ring member, each said unit including a cylinder member pivotally mounted on the corresponding clamping ring member and a piston rod extending from said cylinder member toward said second end of the corresponding clamping ring member, each said piston rod having an outer end pivotally connected to said pressure device at a location adjacent said second ends when said clamping ring members interengage said cover member and said pressure device.

24. A closure according to claim 1, wherein said cover member includes an annular circumferentially extending wall having axially outer and inner ends, said cover member flange being at said inner end, said pressure device including annular wall means providing said opening, said wall and said wall means having corresponding inner surfaces, an annular resilient metal sleeve mounted on the inner surface of said wall and extending axially inwardly from said inner end thereof to overlie the inner surface of said wall means, and resilient sealing means radially interposed between said sleeve and said inner surface of said wall means.

25. A closure according to claim 24, wherein said sleeve includes a circumferential recess therein opening radially toward said inner surface of said wall means, and said sealing means is an annular sealing member carried in said recess.

26. A closure for a pressure device having an opening bounded by a radially projecting circumferential flange comprising, a cover member having a radially projecting circumferential flange axially engaging said flange on said pressure device, a pair of clamping ring members releaseably interengaging said flanges on said pressure device and said cover member, said clamping ring members extending circumferentially about said flanges and having corresponding and circumferentially adjacent first and second ends, said first ends being pivotally interconnected with said pressure device for said ring members to be pivotally displaceable laterally inwardly and outwardly relative to said flanges between first and second positions in which said ring members respectively interengage said cover member and said pressure device and release said cover member for removal from said pressure device, means for displacing said clamping ring members between said first and second positions, and interengaging guide means on each said ring member and said pressure device interengaging during lateral movement of said clamping ring members between said first and second positions.

27. A closure according to claim 26, wherein said guide means includes radially extending guide pin means on said pressure device for each said clamping ring member and guide plate means on each said clamping ring member adjacent said second end thereof and having a circumferentially extending guide slot receiving the corresponding guide pin means.

28. A closure according to claim 27, wherein each said guide slot has a closed circumferentially outer end engaged by said corresponding guide pin means to stop the corresponding clamping ring member in said second position.

29. A closure according to claim 28, wherein said first and second ends of said clamping ring members are respectively lower and upper ends with respect to said opening in said pressure device, and said guide pin means engage said closed outer ends of said guide slots for said guide plate means and guide pin means to support said clamping ring members in said second positions thereof.

30. A closure according to claim 29, wherein said means for displacing said clamping ring members includes a hydraulic piston and cylinder unit for each clamping ring member, each said unit including a cylinder member pivotally mounted on the corresponding clamping ring member and a piston rod extending from said cylinder member toward said second end of the corresponding clamping ring member, each said piston rod having an outer end pivotally connected to said pressure device at a location adjacent said second ends when said clamping ring members interengage said cover member and said pressure device.

31. A closure according to claim 30, and releaseable latching means interengaging said second ends of said clamping ring members in said first positions thereof against displacement toward said second positions.

* * * * *